United States Patent

[11] 3,563,563

[72] Inventor Zeljko Radovic
Aarau, Switzerland
[21] Appl. No. 814,782
[22] Filed Apr. 9, 1969
[45] Patented Feb. 16, 1971
[73] Assignee Sybron Corporation
Rochester, N.Y.
[32] Priority July 11, 1968
[33] Germany
[31] p 17 55 928.3

[54] RUNNING FRAME FOR A CONTAINER
3 Claims, 1 Drawing Fig.
[52] U.S. Cl............................................. 280/79.1;
16/35
[51] Int. Cl............................................. B60b 33/02
[50] Field of Search............................................. 280/79.1,
79.2; 16/35; 198/(Inquired); 186/(Inquired)

[56] References Cited
UNITED STATES PATENTS
| 1,695,928 | 12/1928 | Perin............................ | 280/79.2 |
| 2,046,105 | 6/1936 | Bowen.......................... | 280/79.2 |
| 2,251,567 | 8/1941 | Gould et al. ................... | 16/35 |
| 2,379,476 | 7/1945 | Cleveland, Jr................. | 280/79.2(X) |
| 2,969,245 | 1/1961 | Wilson ......................... | 280/79.1(X) |
| 3,356,040 | 12/1967 | Fonden ........................ | 104/130 |
| 3,416,682 | 12/1968 | Pezzuti........................ | 16/35(X) |

Primary Examiner—Leo Friaglia
Assistant Examiner—Leslie J. Papemer
Attorney—Theodore B. Roessel ABSTRACT: A frame (10) for supporting containers and the like is provided with castors (12,14) for rolling the frame along the floor surface. Two of the castors (14) are lockable to facilitate handling of the frame as it is being manually pushed along the floor surface, the castors being unlocked automatically to facilitate the movement of the frame along the floor surface by mechanical means.

PATENTED FEB 16 1971
3,563,563
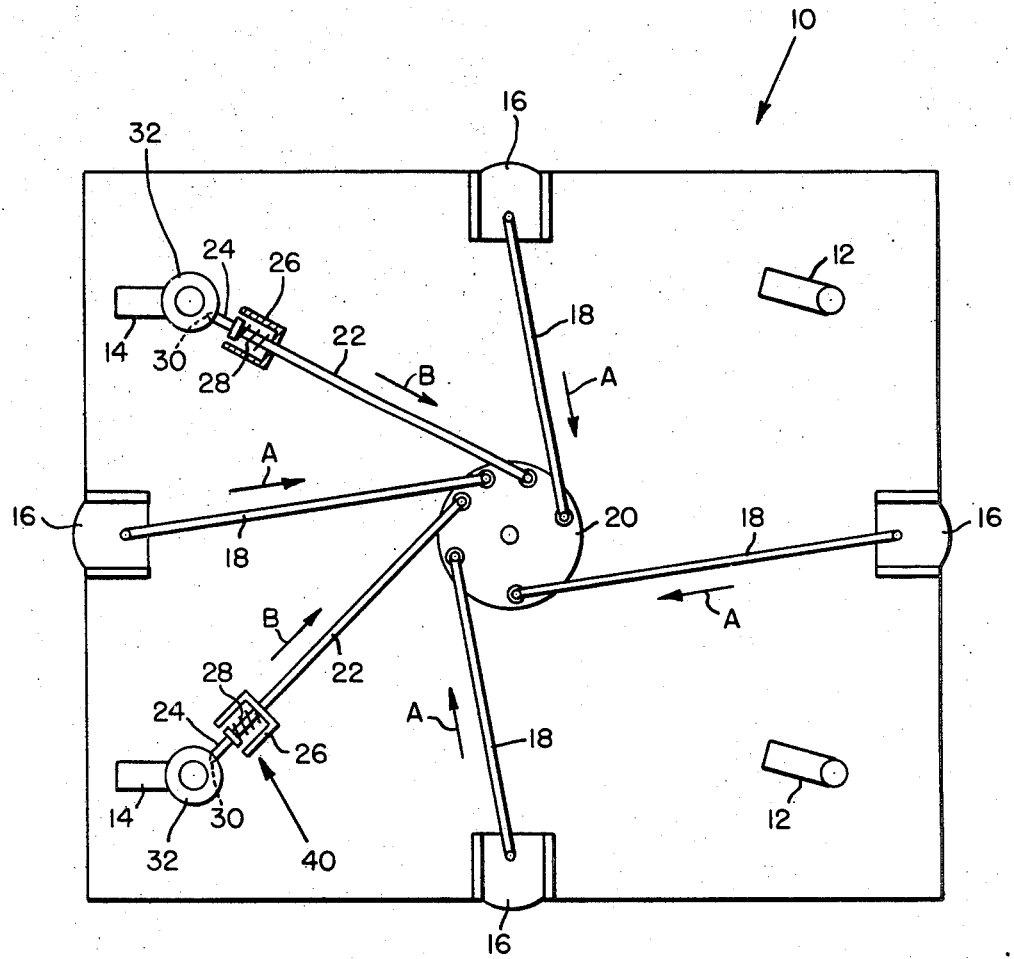
INVENTOR.
ZELJKO RADOVIC
BY
Theodore B Roessel
ATTORNEY

3,563,563

RUNNING FRAME FOR A CONTAINER

BACKGROUND OF THE INVENTION

The present invention relates to a frame for moving containers and the like along a floor surface wherein the frame is mounted on castors, one or more of the castors being lockable in a fixed position to facilitate manual movement of the frame along the floor surface or unlocked to facilitate movement of the frame along the floor surface by mechanical means.

Material-handling systems wherein loads are transported from one station to another via an overhead trackway, such as a monorail, are already in use in hospitals, offices and the like. The loads conveyed by such a monorail system are usually contained in wheeled containers which are separable from the track-guided transport vehicle. In order to operate such a material-handling system as automatically as possible, it is desirable that the unloading or loading be done automatically. It is particularly important that a container which has been separated from its transport vehicle at one station be removed from the station as quickly as possible in order to permit the next arriving transport vehicle to discharge its load.

For purposes of moving wheel-mounted containers away from the stop station, an automatic conveyor has been developed in which the endless belt of the conveyor is driven across magnets, the containers being attracted against the belt by the magnets for movement by the belt across the floor surface and away from the stop station. This magnetic conveyor forms no part of the present invention and it is sufficient for purposes of the present invention to say that it is described in more detail in U.S. Pat. application Ser. No. 814,783, filed April 9, 1961. Once the container has been moved away from the stop station by conveyor belt, the wheeled container is then shifted manually to its final destination.

The fact that the container is moved both mechanically and manually presents certain problems with respect to the castors on which the container rides. For example, when the container is moved mechanically by the conveyor belt, the castors preferably should all be free wheeling so as not to affect or impede movement of the container by the belt. For example, with all the castors free wheeling, the container can be placed against the belt in any orientation whereas with fixed wheels, the container must be placed against the belt in a particular orientation. On the other hand, manual shifting of the container is facilitated by having some of the wheels fixed and the others mounted on swivels so that an operator pushing or pulling the container is better able to control its direction of motion.

SUMMARY OF THE INVENTION

In the present invention, a container is provided with castors journaled to the bottom of the container wherein at least one of the castors can be locked in a fixed position to facilitate manual shifting of the container or unlocked to facilitate movement of the container by mechanical means. The locking or unlocking of the castor is accomplished by at least one actuating element which projects outwardly from the container so that as the container is placed against the magnetic belt, the actuator is depressed which unlocks the castor. By the same token when the container is separated from the container, the actuating member is released to lock the castor in a fixed position. Preferably, the container has at least one actuator projecting outwardly from each side of the container so that engagement of any side of the container against the conveyor belt will operate to unlock the castor. In cases where more than one castor is lockable, the actuating members are connected via a common member to each lockable castor so that operation of any actuator will lock or unlock all the lockable castors.

OBJECTS OF THE INVENTION

It is an object of the present invention to provide a moveable supporting means for containers and the like which can be easily shifted by either mechanical or manual means.

Another object of the present invention is to provide a container which is supported by a plurality of castors, at least one of the castors being lockable by at least one actuating element projecting outwardly from the container.

A further object of the present invention is to provide a container having at least one lockable caster wherein the locking device is actuated by moving the container against a surface normal to the floor surface.

Another object of the present invention is to provide a container having at least one lockable castor wherein an actuator for locking or unlocking the castor projects outwardly from each side of the container.

These and other objects, advantages, and characterizing features of of the present invention will be more preparant upon consideration of the following detailed description thereof when taken in conjunction with the accompanying drawing.

DESCRIPTION OF THE DRAWINGS

The sole FIGURE is a bottom view of a container constructed according to the present invention.

DETAILED DESCRIPTION OF THE PREFERRED EMBODIMENT

Referring to the drawing, the sole figure shows the bottom of a container generally indicated at 10 to include a pair of free-swiveling castors 12 and a pair of lockable castors 14 pivoted to the bottom of the container. While the invention shall be described as if castors 12 and 14 were fixed directly to the bottom of the container, it should be appreciated that the reference numeral 10 could equally represent the underside of a frame or other supporting means on which the container can be placed, and that while the invention shall be described with respect to four castors that the invention is equally applicable to any supporting frame or container having three or more castors.

Extending from one side of the container is an actuating member 16 which is slidably connected to the container. As shown in the figure, actuating element 16, in a normal position, projects outwardly from the side of the container. Each actuating element 16 is pivotally connected to a rod member 18 which in turn is pivotally connected adjacent the periphery of a disc member 20 journaled adjacent the center of the base of the container. With this arrangement, movement of any actuating element 16 towards the center of the container will cause the disc 20 to rotate slightly.

Also connected to the periphery of disc 20 are a pair of locking rods 22 which extend from the disc to the lockable castors 14. The end 24 of each rod adjacent the lockable castors is guided by a spring housing 26 fixed to the bottom of the container. Within each spring housing 26 is a spring 28 which urges each locking rod end 24 toward a castor 14. Each castor 14 carries a locking disc 32 which is provided with a locking groove 30, the end 24 of each locking member being urged by spring 28 into groove 30 for locking engagement with disc 32. Thus, spring 28, locking rod end 24 and locking disc 32 comprise the locking means generally indicated at 40.

When a container is being moved manually, no force is applied to the sides of the container and therefore actuating element 16 projects slightly from the sides of the container. Also, during manual displacement of the container locking means 40 is engaged to hold the lockable castors parallel to the direction of motion of the container so that castors 14 work as unpivotable rollers thereby facilitating manual movement of the container.

However, if the container is moved against an automatic conveyor as set out herein above in which the container is first moved laterally against the conveying belt and then transported by the conveyor belt along the floor surface, the two locked castors 14 will considerably affect the uniform lateral engagement of the container on the conveying belt and thereafter the movement of the container by the conveyor. Accordingly, this difficulty is overcome according to the invention in that during movement of the container against the conveyor, one of the actuating members 16 is depressed, moving rod member 18 in the direction indicated by arrow A towards disc 20. This rotates disc 20 clockwise which in turn moves locking rods 22 in a direction against the bias of spring 28 as indicated by arrow B to withdraw locking rod ends 24 from their engagement with locking discs 32, freeing the castors.

After the container has been transported by the conveyor to its unloading station and is separated from the conveying belt, the bias of spring members 28 acting on locking rods 22 urges the ends 24 of the rods into engagement with locking discs 30. Movement of rods 22 towards castors 14 also causes disc 20 to rotate counterclockwise which extends actuating elements 16 from the sides of the container.

Accordingly, it would be appreciated that the present invention accomplishes its intended objects providing a container which is freely and easily moved by both manual or mechanical means wherein at least one castor of the container is lockable in a fixed position to facilitate a manual movement of the container, the castor being unlocked to permit movement of the container by mechanical means.

I claim:

1. In a mobile support for containers and the like including a frame and a plurality of free-swiveling casters journaled to the frame with at least one of the casters being lockable in a fixed position to prevent the same from swiveling, the improvement comprising means for automatically unlocking the lockable caster upon abutment of the frame against an upright surface comprising:

a connecting member journaled to the underside of said frame adjacent the center thereof;

a locking rod having one end engageable with said lockable caster to lock the same and a second end pivotally attached to said connecting member adjacent the periphery thereof, wherein rotation of said connecting member in one direction pulls said locking rod axially and away from said lockable caster;

bias means normally urging said locking rod into engagement with said lockable caster;

an actuating member slidably connected to said frame at a side thereof, said actuating member having a portion extending outwardly from the side of said frame constructed and arranged for abutment against an upright surface, wherein abutment of said portion against the upright surface, moves said portion into said frame; and a connecting rod pivotally connected at one end to said actuating member and another end to said connecting member adjacent periphery thereof, said connecting rod being driven axially responsive to the movement of said actuating member to rotate said connecting member in said one direction whereby said locking rod is pulled against said bias means and out of engagement with said lockable caster.

2. A mobile support as set forth in claim 1 having at least two lockable casters and two locking rods each associated with one of said lockable casters, the rotation of said connecting member simultaneously pulling both of said locking rods out of engagement with said lockable casters.

3. A mobile support as set forth in claim 2 having a plurality of actuating members each located at one side of said frame and a plurality of connecting rods each connecting one of said actuating members to said connecting member, the operation of any one of said actuating members rotating said connecting member in said one direction whereby all of said locking rods are simultaneously pulled out of engagement with said lockable casters to unlock the same upon operation of any one of said actuating members.

PO-1050
(5/69)

UNITED STATES PATENT OFFICE
CERTIFICATE OF CORRECTION

Patent No. __3,563,563__  Dated __2/16/71__

Inventor(s) __Zeljko Radovic__

It is certified that error appears in the above-identified patent and that said Letters Patent are hereby corrected as shown below:

Col. 2, line 38 - Change "one" to -- each --.

Signed and sealed this 1st day of June 1971.

(SEAL)
Attest:

EDWARD M. FLETCHER, JR.
Attesting Officer

WILLIAM E. SCHUYLER, JR.
Commissioner of Patents